United States Patent
Priess et al.

(10) Patent No.: US 8,752,882 B2
(45) Date of Patent: Jun. 17, 2014

(54) MOTOR VEHICLE BODY WITH PLASMA-TREATED GLUING SURFACE

(71) Applicant: GM Global Technology Operations LLC, Detroit, MI (US)

(72) Inventors: Klaus-Albert Priess, Mainz (DE); Michael Alhof, Floersheim (DE); Robert Mann, Nierstein (DE); Harald Schenk, Harxheim (DE); Sharon Orlans, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/653,594

(22) Filed: Oct. 17, 2012

(65) Prior Publication Data
US 2013/0200649 A1    Aug. 8, 2013

(30) Foreign Application Priority Data
Oct. 17, 2011   (DE) .......................... 10 2011 116 045

(51) Int. Cl.
*B60J 10/08*    (2006.01)

(52) U.S. Cl.
USPC ..................................... 296/146.9; 296/146.1

(58) Field of Classification Search
USPC .......................................... 296/146.1, 146.9
See application file for complete search history.

(56) References Cited

U.S. PATENT DOCUMENTS

| | | | | |
|---|---|---|---|---|
| 6,141,854 A | * | 11/2000 | Mueller et al. | 29/450 |
| 6,837,005 B2 | * | 1/2005 | Arata et al. | 49/440 |
| 7,293,820 B2 | * | 11/2007 | Hashimoto et al. | 296/146.9 |
| 2010/0292757 A1 | | 11/2010 | Ehlbeck et al. | |
| 2011/0111236 A1 | | 5/2011 | Pahl et al. | |

FOREIGN PATENT DOCUMENTS

| | | |
|---|---|---|
| DE | 19928649 A1 | 12/2000 |
| DE | 102005045298 A1 | 4/2007 |
| DE | 102006003940 A1 | 8/2007 |
| DE | 102006060391 A1 | 6/2008 |
| DE | 102009025065 A1 | 9/2010 |
| JP | 2001301075 A | 10/2001 |

OTHER PUBLICATIONS

German Patent Office, German Search Report for Application No. 102011116045.4, dated Jul. 11, 2012.

* cited by examiner

*Primary Examiner* — Lori Lyjak
(74) *Attorney, Agent, or Firm* — Ingrassia Fisher & Lorenz, P.C.

(57) ABSTRACT

An assembly method and a motor vehicle body having at least one marginal portion delimiting a bodywork opening is provided. The motor vehicle includes a plasma-treated gluing surface to which a seal is fastened in a materially joined manner.

6 Claims, 2 Drawing Sheets

MOTOR VEHICLE BODY WITH PLASMA-TREATED GLUING SURFACE

CROSS-REFERENCE TO RELATED APPLICATION

This application claims priority to German Patent Application No. 10 2011 116 045.4, filed Oct. 17, 2011, which is incorporated herein by reference in its entirety.

TECHNICAL FIELD

This application pertains to a motor vehicle body and to a seal fastened thereto by material joining.

BACKGROUND

Marginal portions of bodywork openings are typically provided with a sealing arrangement. Thus, for example a marginal portion delimiting a door opening of the bodywork is provided for example with a primary seal, whereas a door wing corresponding to the door cutout of the bodywork is provided with a secondary seal, which with closed door mutually come to bear on bodywork components located opposite in each case.

Popular seals have a flexible sealing lip approximately designed in the manner of a hollow profile or hose and a fastening portion connected therewith, which can be connected in different ways to a flange on the body side provided in the marginal portion of the door opening for example in a positively-joined or materially-joined manner.

DE 10 2006 060 391 A1 for example discloses a sealing arrangement or sealing the bodywork of a motor vehicle, wherein a flange is formed through an outer and an inner frame part and comprises a face end. The seal that can be fastened to the frame part comprises a sealing portion and a fastening portion, wherein the sealing portion is provided with at least one hollow chamber, which at least in certain areas covers an outer surface of the outer frame part. The seal is additionally provided with a covering lip, through which the face end of the flange can be covered. An extension of the covering lip protruding over the flange additionally comprises a groove which receives an edge of an inner covering protruding against the flange or against the seal.

Because of the geometrical configuration of the flange on the body side, the seal fastened thereto and the covering lip covering the face end of the flange, the seal has to be fastened to the bodywork opening with assembly-related respect before the assembly of an interior covering. Since the interior covering is to be likewise covered by the covering lip, it is additionally required after the assembly of the interior covering to manually lift and pull the covering lip over the subsequently installed interior covering. To this end, a separate pulling cord, for example a pull cord is included in the seal, by means of which the sealing lip can be lifted area by area and thus pulled over the interior covering adjoining the seal area by area.

In addition to a positively joined connection of seal and bodywork flange it is furthermore conceivable to glue the seal onto a corner portion adjoining the bodywork flange. However, in order to be able to provide adequate adhesion between seal to be glued and gluing surface on the bodywork side, the gluing surface on the bodywork side has to be manually cleaned in quite an involved manner, for example subject to the use of textiles soaked in cleaning fluid. For a gluing arrangement of a seal it is additionally required to mask the gluing surface on the bodywork side before a painting process of the body for example with protective masking tape, so that the gluing surface remains largely free of paints or waxes in a painting process.

Accordingly, it is desirable to simplify the fastening of a seal to a motor vehicle body. Furthermore, it is desirable to fasten the seal to the bodywork in as simple and intuitive a manner as possible as well as in a reliable, lasting and durable manner. In addition, it is desirable to integrate the assembly of the seal in the vehicle final assembly in a universal and flexibly adaptable manner.

In addition, other objects, desirable features and characteristics will become apparent from the subsequent summary and detailed description, and the appended claims, taken in conjunction with the accompanying drawings and this background.

SUMMARY

According to various exemplary embodiments, provided is a motor vehicle body comprising at least one marginal portion delimiting a bodywork opening, for example a door opening, window opening or engine compartment opening for fastening a seal thereon. Here it is provided that the marginal portion comprises a plasma-treated gluing surface, on which the seal provided for the sealing of the bodywork opening is fastened in a materially joined manner. Thus it is provided in one example, to fasten the at least one seal in an adhesive or gluing manner to the marginal portion of the bodywork opening, wherein a gluing surface on the bodywork side is subjected to a plasma treatment prior to a gluing fastening of the seal thereon.

In one exemplary embodiment, it is provided to clean the gluing surface on the bodywork side by means of an atmospheric plasma. By means of a plasma jet, for example ionized atoms as well as electrons are directed at the gluing surface of the bodywork to be cleaned. By means of this, anything adhering, for example, substances and substance mixtures on polymer base such as for example paints or waxes can be removed from the gluing surface free of chemicals and largely without contact. In addition, through a plasma treatment process, the polarity of the surface of the gluing surface can be increased, the wettability of the gluing surface as well as its chemical affinity improved.

Through the plasma treatment of the gluing surface on the body side, the adhesion of an adhesive tape or a glue can be improved, so that a sealing arrangement can be fastened to a plasma-treated gluing surface of the body generally easily and reliably as well as durably. Through the plasma treatment, in particular, through the plasma cleaning of the gluing surface on the body side, comparatively cost-effective adhesive tapes and adhesives can also be utilized without suffering in terms of their gluing connection or gluing action, so that manufacturing and assembly costs for applying a glued seal can be advantageously lowered.

According to another exemplary embodiment, the seal comprises a fastening portion, which is fastened to the plasma-treated gluing surface on the body side by means of a double-sided adhesive tape. In addition to the fastening portion, the seal also typically comprises a deformable or elastic sealing portion, which during the closing-off of the body opening, sealingly comes to bear against a bodywork component assigned to the opening. If the seal is designed for example as primary seal in a door region to be arranged on the body side, the fastening portion is generally fastened to a flange of the opening rim, while the sealing portion sealingly comes to bear against a closed door wing.

According to another exemplary embodiment, the fastening portion of the seal comprises at least one extension extending over the gluing surface and beyond, which in the final assembly position at least in certain areas covers a covering component on the motor vehicle body, for example, an interior covering component. Through pretreatment of the gluing surface on the body side by means of a plasma process, the seal can also be fastened to a flange portion on a body side only after an assembly of a covering, for example, an interior covering, so that the use of a pull cord for example for the lifting of a seal portion at least in certain areas over the covering component and beyond becomes advantageously superfluous.

According to another exemplary embodiment, the gluing surface on the body side is cleaned by means of an atmospheric plasma. An atmospheric plasma can be universally ignited in an atmospheric environment and for example be directed onto the gluing surface of the vehicle body to be cleaned by means of a suitably designed plasma nozzle.

According to another exemplary embodiment, the fastening portion of the seal comprises at least two legs oriented at a predetermined angle to each other, wherein a leg is fastened to a flange portion of the bodywork by means of the adhesive tape and the other leg extends over and beyond a face end of the flange. The leg extending over the face end of the flange is generally designed as an extension extending over the gluing surface and beyond, which at least in certain areas covers a covering component which adjoins a side of the flange facing away from the gluing surface of the flange.

In another exemplary embodiment, the fastening portion is provided with the adhesive tape or the leg of the fastening section is provided with the adhesive tape, which comprises a sealing portion designed for example in the manner of a sealing lip. The sealing portion and the fastening portion of the seal in this case can be designed unitarily. However, it is equally conceivable that sealing portion and fastening portion are co-extruded from different materials, wherein the sealing portion generally comprises a soft-elastic plastic or rubber material and the fastening portion generally comprises a comparably solid plastic or rubber material.

It is also provided in one exemplary embodiment that a sealing portion of the seal directly adjoins or is connected to the leg of the fastening portion provided with the adhesive tape.

According to another exemplary embodiment, the fastening portion of the seal comprises two legs substantially lying on top of each other, which form a gap or groove-like mounting between them. The two legs in this case form a kind of U-profile, wherein one of the legs is generally unitarily connected to the approximately hollow chamber profile-like sealing portion and the other leg on its outside comprises the double-sided adhesive tape for the adhesive fastening to the plasma treated gluing surface on the body side. The mounting, which is formed by the two legs, serves for the sliding in of a further component, for example a covering component, which in the region of the mounting is oriented approximately parallel to the plasma-treated gluing surface of the vehicle body.

On an insertion margin of the mounting formed by the two legs at least one thickened bead can be provided, which can provide a predetermined pulling-off force for the component to be inserted into the mounting.

According to another exemplary embodiment, a motor vehicle is furthermore provided, which comprises the previously described bodywork provided with a seal.

Furthermore, according to another exemplary embodiment, a method for the assembly of a seal on a motor vehicle body is provided. The method in this case comprises initially subjecting a gluing surface of a marginal portion of the motor vehicle body delimiting a bodywork opening to a plasma treatment, cleaning such by means of an atmospheric plasma and fastening a seal to the plasma-treated gluing surface in a materially joined manner.

It proves to be advantageous in this case when according to another exemplary embodiment the gluing surface on the body side is only plasma treated after the completion of a painting of the bodywork. Since by means of a plasma-assisted cleaning the gluing surface on the body side provided for attaching the seal can be freed of adhering particles and coatings without problems, the bodywork portions provided for a gluing seal no longer have to be masked or covered with adhesive tape for a painting process, for example a cathodic immersion painting process (KTL-process). By means of the plasma process, paints and waxes, or further substances and coatings adhering to the sheet metal of the bodywork for example as part of an immersion painting can be removed without problems and the gluing surface on the body side optimally prepared for a gluing process.

In addition, according to another exemplary embodiment, the gluing surface on the body side is only plasma-treated after an arrangement of a covering component, for example, of an interior covering component adjoining the marginal portion. Since the plasma treatment of the gluing surface can for example be carried out in a robot-controlled and therefore precise as well as locally delimited manner on portions of the body provided for this purpose, there is no risk of damage of the previously assembled interior covering, which can adjoin the flange portion of the bodywork to be cleaned.

In one exemplary embodiment, the seal comprises an extension or a further leg that is angled off relative to a fastening leg, by means of which the seal can be fastened to the gluing surface in a manner at least in certain areas covering the covering component. The two legs of the fastening portion of the seal can be oriented approximately perpendicularly to each other and have a correspondingly L-shaped cross-sectional profile.

The inside of one of the legs in this case is advantageously provided with a double-sided adhesive tape, which can be fastened to the gluing surface of the body in an adhesive and thus materially-joined manner, for example, of a flange portion provided on an opening rim, wherein the other leg of the fastening portion for example designed as covering leg extends over a face end of the flange and a covering component arranged adjoining the flange, for example, at least in certain areas covers an interior covering component.

According to another exemplary embodiment, it can be provided to provide the plasma-treated for example, the plasma-cleaned gluing surface of the bodywork with a double-sided adhesive tape directly after the plasma treatment. The adhesive tape in this case can also be fastened to the gluing surface of the bodywork before and independently of the seal. Here it is even conceivable to fasten the double-sided adhesive tape beforehand to the body-in-white insofar plasma-treated before a painting process. After the painting and/or drying process has been carried out, a protective film of the double-sided adhesive tape can be removed and a suitably designed seal fastened to the gluing surface provided by the adhesive tape.

Insofar, according to another exemplary embodiment, the seal can also be subsequently glued to an adhesive tape fastened in advance to the gluing surface of the bodywork.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
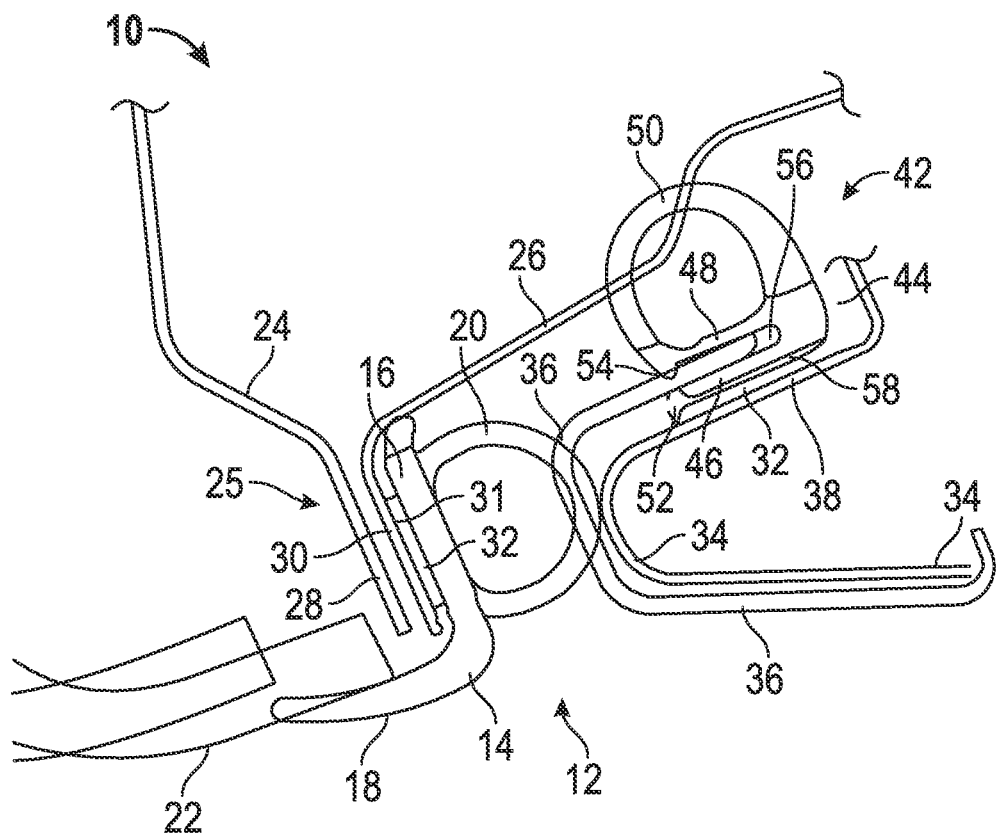
FIG. 1 illustrates an exemplary sealing arrangement in cross section.

FIG. 1 shows a sealing arrangement 10 in cross section, which altogether comprises two seals 12, 42, which are designed as primary and secondary seals respectively, for example for sealing a door gap of a motor vehicle body. The motor vehicle body comprises two bodywork panels 24, 26 adjoining a marginal portion to be sealed, which with flange portions 28, 30 formed corresponding to each other form a marginal portion 25, on which for example the primary seal 12 is adhesively fastened.

The seal 12 comprises a fastening portion 14 approximately configured L-shaped and a hollow chamber-like sealing portion 20. Fastening portion 14 and sealing portion 20 in this case can be produced from different materials on plastic or rubber bases, wherein the sealing portion 20 advantageously has a greater elasticity than the fastening portion 14.

The fastening portion 14 comprises a fastening leg 16, which by means of an adhesive tape 32 is adhesively fastened to an outside of a flange portion 30 of the marginal portion 25 facing to the right in FIG. 1 and designed as gluing surface 31. The further leg 18, which is unitarily connected to the leg 16, acts as covering leg or covering lip and protrudes over and beyond the face end of the two flange portions 28, 30 which are connected to each other, generally welded to each other.

Furthermore, the leg 18 has a shape slightly sweeping upwards or facing the body panel 24 and comes to bear against an outside of an interior covering component 22 facing downwards, which adjoins an inside of the flange portion 28 located inside. The outside of the flange portion 30 designed as gluing surface 31 has been plasma-treated, for example, plasma-cleaned before the adhesive attachment of the seal 12, wherein generally an atmospheric plasma is employed. By means of the plasma treatment, the gluing surface 31 insofar provided on the flange portion 30 can be thoroughly and effectively cleaned and prepared for the adhesion of the adhesive tape 32.

The plasma process renders the use of solvent-containing cleaning fluids superfluous and can additionally improve the wettablility of the gluing surface 31, for example, for the adhesion of an adhesive of the adhesive tape 32.

In addition to a seal 12 provided on the body side, a secondary seal 42 can also be fastened in the same manner for example to a bodywork part 34 designed as door wing. The bodywork part 34 insofar likewise provides a gluing surface 38 of substantially flat design, which prior to the adhesive attachment of the seal 42 by means of the adhesive tape 32, is subjected to a plasma treatment, for example, a plasma cleaning.

The seal 42, which in the present example acts for example as secondary seal, comprises a fastening portion 44, which comprises two legs 46, 48 which are oriented parallel to each other. The two legs 46, 48 form a groove or slit-like mounting 56, in which for example a covering component 36 can be pushed in and fastened in the mounting 56 by means of a bead 54. The fastening portion 44 can furthermore comprise a reinforcement 58 facing the gluing surface 38, which can for example be formed of metal or a different type of plastic or rubber material than the remaining fastening portion 44.

The reinforcement 58 located at the bottom in the present exemplary embodiment and facing the gluing surface 38 in this case is provided with the double-sided adhesive tape 32 and furthermore comprises a further bead 52 located opposite the bead 54, so that the opening of the mounting 56 facing its mounting margin comprises a cross-sectional taper by means of which a predetermined pulling-off or retaining force for the covering part 36 to be inserted into the mounting 56 can be provided.

With the fastening portion 44, a hollow profile-like sealing portion 50 is unitarily connected, which in the final assembly configuration shown in FIG. 1, sealingly comes to bear against the bodywork panel 26 on the outside.

With respect to assembly, the plasma treatment of the gluing surface 31, 38 on the body side proves to be advantageous insofar as a pretreatment of the gluing surfaces 31, 38 can take place following a painting and/or drying process of the body-in-white.

Figure 2:
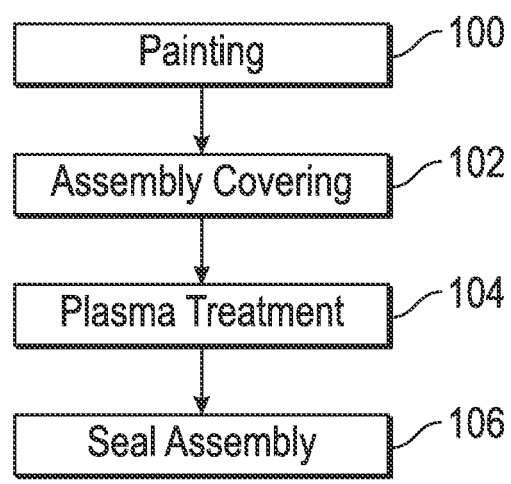
FIG. 2 is an exemplary flow diagram of a method for the assembly of the sealing arrangement.

Insofar, a painting and/or drying process is provided in 100 according to a production method, such as is schematically shown in the flow diagram according to FIG. 2. In the following, a covering, for example, an interior covering is fastened to the bodywork in 102. Following this, a plasma treatment of the gluing surface on the body side is carried out in 104, before in a concluding process, generally directly after the plasma treatment, a seal that is preconfigured with a double-sided adhesive tape is adhesively fastened to the plasma-pretreated gluing surface on the body side. The assembly of the seal can take place by means of plasma treatment at a comparatively later time of the motor vehicle assembly process. Here it is conceivable to omit the embedding of a pull cord in the seal, since said seal may no longer have to be subsequently pulled over the interior covering under certain conditions.

Alternatively, it is obviously also conceivable to carry out the plasma treatment and the assembly of the seal directly following thereafter before an installation of the interior covering, consequently to switch 102 and 104 of the flow diagram according to FIG. 4. With such an assembly, the seal is still provided with a pull cord so that at least in certain areas it can be pulled over the interior covering previously arranged on the motor vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A motor vehicle body, comprising:
   at least one marginal portion delimiting a bodywork opening, the bodywork opening having a first plasma-treated gluing surface and a second plasma-treated gluing surface;
   a first seal fastened in a materially-joined manner to the first plasma-treated gluing surface, the seal comprising a first fastening portion, which is fastened to the first plasma-treated gluing surface by means of a first double-sided adhesive tape; and
   a second seal fastened in a materially joined manner to the second plasma-treated gluing surface, the seal comprising a second fastening portion, which is fastened to the second plasma-treated gluing surface by means of a second double-sided adhesive tape;
   wherein the first fastening portion comprises two legs oriented at a predetermined angle to each other, wherein one leg is fastened by means of the first double-sided adhesive tape to the first plasma-treated gluing surface of the motor-vehicle body formed on a flange and the other leg extends over and beyond a face end of the flange;
   wherein the second fastening portion comprises a U-profile, further comprising two parallel legs which form a groove-like mounting between them, wherein an outside of one of the two parallel legs is fastened to the second plasma-treated gluing surface using the second double-sided adhesive tape, and wherein the groove-like mounting is oriented in parallel to the second plasma-treated gluing surface; and
   wherein a sealing portion directly adjoins a leg of the first fastening portion of the seal provided with the first double-sided adhesive tape.

2. The motor vehicle body according to claim 1, wherein the first fastening portion comprises at least one extension extending over and beyond the first plasma-treated gluing surface, which at least in certain areas covers a covering component.

3. The motor vehicle body according to claim 1, wherein the first plasma-treated gluing surface and the second plasma-treated gluing surface are cleaned by means of an atmospheric plasma.

4. A motor vehicle comprising:
   a body having at least one opening, the opening having a first plasma-treated gluing surface and a second plasma-treated gluing surface;
   a first seal having a first fastening portion, which is fastened to the first plasma-treated gluing surface by means of a first double-sided adhesive tape; and
   a second seal comprising a second fastening portion, which is fastened to the second plasma-treated gluing surface by means of a second double-sided adhesive tape;
   wherein the first fastening portion comprises two legs oriented at a predetermined angle to each other, wherein one leg is fastened by means of the first double-sided adhesive tape to the first plasma-treated gluing surface of the body formed on a flange and the other leg extends over and beyond a face end of the flange;
   wherein the second fastening portion comprises a U-profile, further comprising two parallel legs which form a groove-like mounting between them, wherein an outside of one of the two parallel legs is fastened to the second plasma-treated gluing surface using the second double-sided adhesive tape, and wherein the groove-like mounting is oriented in parallel to the second plasma-treated gluing surface; and
   wherein a sealing portion directly adjoins a leg of the first fastening portion of the seal provided with the first double-sided adhesive tape.

5. The motor vehicle according to claim 4, wherein the fastening portion comprises at least one extension extending over and beyond the first plasma-treated gluing surface, which at least in certain areas covers a covering component.

6. The motor vehicle according to claim 4, wherein the first plasma-treated gluing surface and the second plasma-treated gluing surface are cleaned by means of an atmospheric plasma.

* * * * *